United States Patent
Ishizuka et al.

(10) Patent No.: US 11,095,542 B2
(45) Date of Patent: Aug. 17, 2021

(54) ELECTRONIC CONTROL UNIT, MONITORING METHOD, AND NON-TRANSITORY COMPUTER READABLE MEDIUM STORING PROGRAM FOR MONITORING A SUBJECT ELECTRONIC CONTROL UNIT CONNECTED TO A NETWORK

(71) Applicant: TOYOTA JIDOSHA KABUSHIKI KAISHA, Toyota (JP)

(72) Inventors: Shu Ishizuka, Okazaki (JP); Yasuhiro Yamasaki, Okazaki (JP); Toshio Kawamura, Nagakute (JP); Masashi Amesara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/252,046

(22) Filed: Jan. 18, 2019

(65) Prior Publication Data
US 2019/0230014 A1    Jul. 25, 2019

(30) Foreign Application Priority Data
Jan. 22, 2018    (JP) .............................. JP2018-008066

(51) Int. Cl.
*H04L 12/26* (2006.01)
*G06F 11/34* (2006.01)
*H04L 12/24* (2006.01)

(52) U.S. Cl.
CPC ...... *H04L 43/0817* (2013.01); *G06F 11/3419* (2013.01); *G06F 11/3466* (2013.01); *H04L 41/046* (2013.01); *H04L 43/10* (2013.01); *H04L 43/12* (2013.01)

(58) Field of Classification Search
None
See application file for complete search history.

(56) References Cited

U.S. PATENT DOCUMENTS

| 5,751,963 A | 5/1998 | Umetsu | |
|---|---|---|---|
| 2004/0029556 A1* | 2/2004 | Goto | B60L 3/12 455/404.1 |
| 2010/0211258 A1* | 8/2010 | Sakurai | B60W 50/0205 701/29.1 |
| 2018/0267922 A1* | 9/2018 | Nara | G06F 3/0619 |

FOREIGN PATENT DOCUMENTS

| JP | H09-270794 A | 10/1997 |
|---|---|---|
| JP | 2008199253 A | 8/2008 |
| JP | 2013-026785 A | 2/2013 |
| JP | 2015080045 A | 4/2015 |

* cited by examiner

*Primary Examiner* — Christine T Duong
(74) *Attorney, Agent, or Firm* — Hunton Andrews Kurth LLP

(57) ABSTRACT

An electronic control unit that monitors a subject electronic control unit that is different from the electronic control unit and is connected to a network includes a transmitting unit that transmits a monitoring packet to the subject electronic control unit, an estimating unit that estimates a state of the subject electronic control unit, based on a reply packet transmitted from the subject electronic control unit in response to the monitoring packet, and a monitoring unit that monitors the subject electronic control unit, based on a monitoring policy selected according to a combination of the state of the subject electronic control unit estimated by the estimating unit, and the state of the electronic control unit.

12 Claims, 14 Drawing Sheets

| OWN ECU STATE | OTHER ECU STATE | MONITORING PACKET TRANSMISSION FREQUENCY | MONITORING DATA STORING |
|---|---|---|---|
| BEFORE START-UP OR CURRENTLY STOPPED | — | TRANSMISSION STOPPED | DISABLED |
| NORMAL OPERATING MODE | CURRENTLY STOPPED | TRANSMISSION STOPPED | DISABLED |
| | BEFORE START-UP | SPECIFIED FREQUENCY | DISABLED |
| | IN NORMAL OPERATION | SPECIFIED FREQUENCY | DISABLED |
| | CURRENTLY AT FAULT | SPECIFIED FREQUENCY | ENABLED |

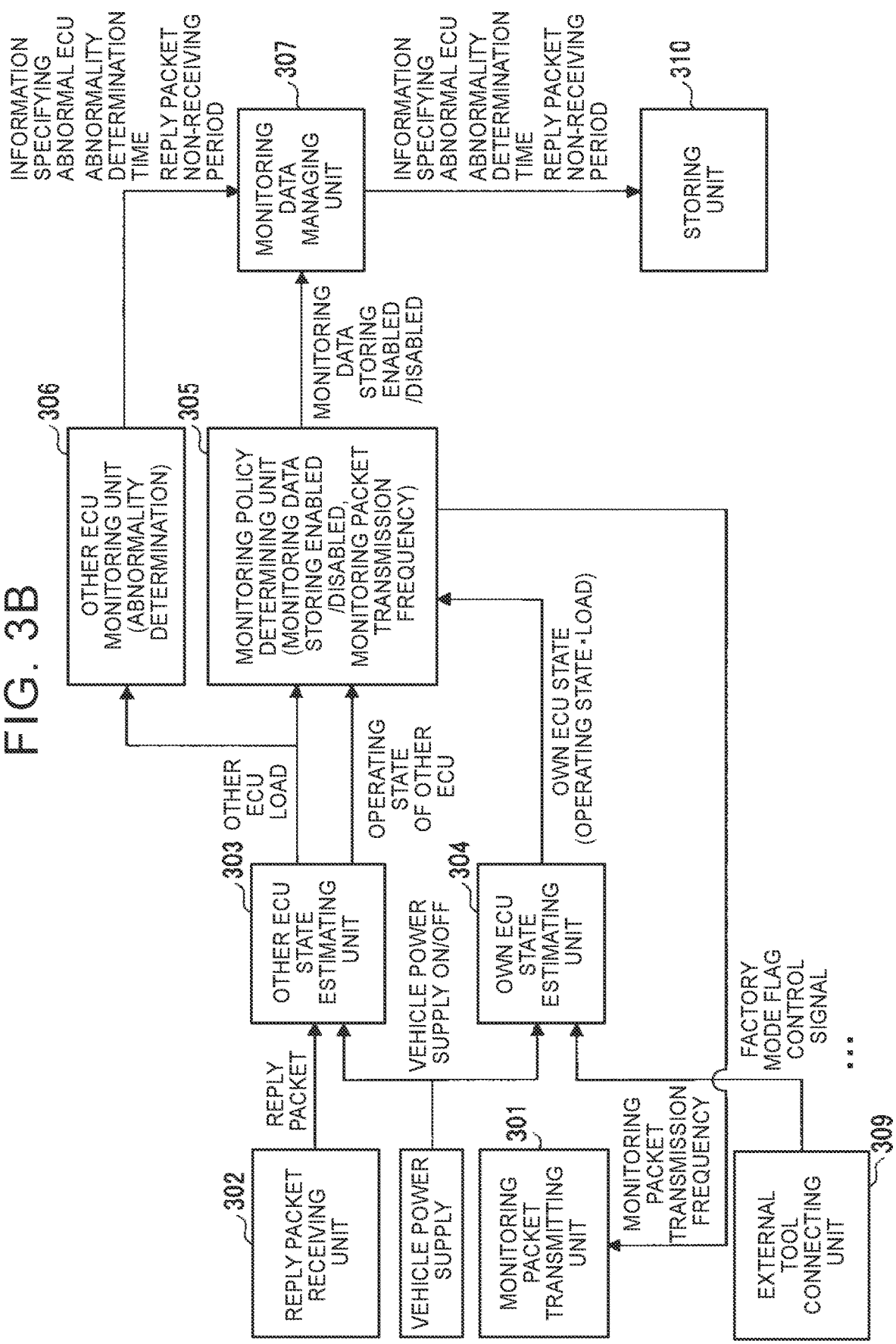

FIG. 4A

| OPERATING STATE OF OTHER ECU | DESCRIPTION |
|---|---|
| CURRENTLY STOPPED | STATE WHERE VEHICLE POWER SUPPLY IS OFF |
| BEFORE START-UP | STATE FROM WHEN VEHICLE POWER SUPPLY IS TURNED ON, TO WHEN OWN ECU TRANSMITS MONITORING PACKET WHILE DISABLING STORING OF MONITORING DATA, AND FIRST RECEIVES REPLY PACKET FROM OTHER ECU |
| IN NORMAL OPERATION | STATE AFTER VEHICLE POWER SUPPLY IS TURNED ON, AND OWN ECU FIRST RECEIVES REPLY PACKET FROM OTHER ECU, AND STATE WHERE OTHER ECU IS NOT AT FAULT |
| CURRENTLY AT FAULT | STATE AFTER VEHICLE POWER SUPPLY IS TURNED ON, AND OWN ECU FIRST RECEIVES REPLY PACKET FROM OTHER ECU, AND STATE WHERE LOAD (REPLY PACKET LOSS RATE OR REPLY TIME) IS EQUAL TO OR LARGER THAN THRESHOLD VALUE |

FIG. 4B

| LOAD OF OTHER ECU | DESCRIPTION |
|---|---|
| MONITORING REPLY TIME | DIFFERENCE BETWEEN TRANSMISSION TIME OF MONITORING PACKET AND RECEIVING TIME OF REPLY PACKET |
| MONITORING PACKET LOSS RATE | RATE AT WHICH REPLY PACKET IS NOT RETURNED WITHIN GIVEN TIME |

FIG. 4C

| OPERATING STATE OF OWN ECU | | MODE DETERMINATION SIGNAL · FLAG | | | DESCRIPTION |
|---|---|---|---|---|---|
| | | FACTOR MODE FLAG | POTENTIAL OF CONTROL SIGNAL | ... | |
| CURRENTLY STOPPED | | - | - | ... | STATE WHERE VEHICLE POWER SUPPLY IS OFF |
| BEFORE START-UP | | - | - | ... | STATE FROM WHEN VEHICLE POWER SUPPLY IS TURNED ON, TO WHEN OWN ECU TRANSMITS MONITORING PACKET |
| IN OPERATION | FACTORY MODE | ON | - | ... | OPERATING IN FACTORY MODE |
| | PROGRAM DATA RELAY MODE | OFF | HIGH | ... | RELAYING PROGRAM DATA OF OTHER ECU |
| | PROGRAM REWRITING MODE | OFF | HIGH | ... | REWRITING PROGRAM OF OWN ECU |
| | ... | ... | ... | ... | ... |
| | NORMAL OPERATING MODE | OFF | LOW | ... | STATE WHERE OWN ECU IS TRANSMITTING MONITORING PACKET, AFTER VEHICLE POWER SUPPLY IS TURNED ON, AND OWN ECU IS NOT IN ANY OTHER STATE |

FIG. 4D

| LOAD OF OWN ECU | DESCRIPTION |
|---|---|
| CPU LOAD | LOAD OF CPU |
| MEMORY USAGE RATE | USAGE RATE OF MEMORY |
| NETWORK BANDWIDTH USAGE RATE | USAGE RATE OF NETWORK BANDWIDTH FOR EACH IP ADDRESS, EACH MC ADDRESS, OR EACH PHYSICAL PORT |

| STATE OF OWN ECU | | | STATE OF OTHER ECU | | | MONITORING POLICY | | |
|---|---|---|---|---|---|---|---|---|
| OPERATING STATE | | LOAD | OPERATING STATE | LOAD | | TRANSMISSION FREQUENCY OF MONITORING PACKET | STORING OF MONITORING DATA | |
| CURRENTLY STOPPED | | - | - | - | | TRANSMISSION STOPPED | DISABLED | ... |
| BEFORE START-UP | | - | - | - | | TRANSMISSION STOPPED | DISABLED | ... |
| IN OPERATION | NORMAL OPERATING MODE | LESS THAN THRESHOLD VALUE | CURRENTLY STOPPED | - | | TRANSMISSION STOPPED | DISABLED | ... |
| | | | BEFORE START-UP | - | | SPECIFIED FREQUENCY | DISABLED | ... |
| | | | IN NORMAL OPERATION | LESS THAN THRESHOLD VALUE | | SPECIFIED FREQUENCY | DISABLED | ... |
| | | | | THRESHOLD VALUE OR GREATER | | SPECIFIED FREQUENCY OR LOWER | DISABLED | ... |
| | | | CURRENTLY AT FAULT | - | | SPECIFIED FREQUENCY | ENABLED | ... |
| | | THRESHOLD VALUE OR GREATER | CURRENTLY STOPPED | - | | TRANSMISSION STOPPED | DISABLED | ... |
| | | | BEFORE START-UP | - | | SPECIFIED FREQUENCY | DISABLED | ... |
| | | | IN NORMAL OPERATION | LESS THAN THRESHOLD VALUE | | SPECIFIED FREQUENCY OR LOWER | DISABLED | ... |
| | | | | THRESHOLD VALUE OR GREATER | | SPECIFIED FREQUENCY OR LOWER | DISABLED | ... |
| | | | CURRENTLY AT FAULT | - | | SPECIFIED FREQUENCY | ENABLED | ... |
| | PROGRAM DATA RELAY MODE | - | - | - | | TRANSMISSION STOPPED | DISABLED | ... |
| | PROGRAM REWRITING MODE | - | - | - | | TRANSMISSION STOPPED | DISABLED | ... |
| | FACTORY MODE | - | - | - | | SPECIFIED FREQUENCY OR HIGHER (OR TRANSMISSION STOPPED) | ENABLED (OR DISABLED) | ... |
| ... | | | | | | ... | ... | ... |

FIG. 9A

| OWN ECU STATE | DESCRIPTION |
|---|---|
| CURRENTLY STOPPED | STATE WHERE VEHICLE POWER SUPPLY IS OFF |
| BEFORE START-UP | STATE FROM WHEN VEHICLE POWER SUPPLY IS TURNED ON, TO WHEN OWN ECU TRANSMITS MONITORING PACKET |
| NORMAL OPERATING MODE | STATE WHERE OWN ECU IS TRANSMITTING MONITORING PACKET, AFTER VEHICLE POWER SUPPLY IS TURNED ON |

| OWN ECU STATE | OTHER ECU STATE | MONITORING PACKET TRANSMISSION FREQUENCY | MONITORING DATA STORING |
|---|---|---|---|
| BEFORE START-UP OR CURRENTLY STOPPED | – | TRANSMISSION STOPPED | DISABLED |
| NORMAL OPERATING MODE | CURRENTLY STOPPED | TRANSMISSION STOPPED | DISABLED |
| | BEFORE START-UP | SPECIFIED FREQUENCY | DISABLED |
| | IN NORMAL OPERATION | SPECIFIED FREQUENCY | DISABLED |
| | CURRENTLY AT FAULT | SPECIFIED FREQUENCY | ENABLED |

FIG. 12A

| OWN ECU STATE | | PROGRAM DATA RELAY FLAG | DESCRIPTION |
|---|---|---|---|
| CURRENTLY STOPPED | | — | STATE WHERE VEHICLE POWER SUPPLY IS OFF |
| BEFORE START-UP | | — | STATE FROM WHEN VEHICLE POWER SUPPLY IS TURNED ON, TO WHEN OWN ECU TRANSMITS MONITORING PACKET |
| IN OPERATION | PROGRAM DATA RELAY MODE | ON | STATE OF RELAYING PROGRAM DATA OF OTHER ECU |
| IN OPERATION | NORMAL OPERATING MODE | OFF | STATE WHERE OWN ECU IS TRANSMITTING MONITORING PACKET, AND IS NOT IN PROGRAM DATA RELAY MODE, AFTER VEHICLE POWER SUPPLY IS TURNED ON |

| OWN ECU STATE | | OTHER ECU STATE | MONITORING PACKET TRANSMISSION FREQUENCY | MONITORING DATA STORING |
|---|---|---|---|---|
| BEFORE START-UP OR CURRENTLY STOPPED | | — | TRANSMISSION STOPPED | DISABLED |
| IN OPERATION | | CURRENTLY STOPPED | TRANSMISSION STOPPED | DISABLED |
| IN OPERATION | | BEFORE START-UP | SPECIFIED FREQUENCY | DISABLED |
| IN OPERATION | | IN NORMAL OPERATION | SPECIFIED FREQUENCY | DISABLED |
| IN OPERATION | | CURRENTLY AT FAULT | SPECIFIED FREQUENCY | ENABLED |
| PROGRAM DATA RELAY MODE | | — | TRANSMISSION STOPPED | DISABLED |

ELECTRONIC CONTROL UNIT, MONITORING METHOD, AND NON-TRANSITORY COMPUTER READABLE MEDIUM STORING PROGRAM FOR MONITORING A SUBJECT ELECTRONIC CONTROL UNIT CONNECTED TO A NETWORK

INCORPORATION BY REFERENCE

The disclosure of Japanese Patent Application No. 2018-008066 filed on Jan. 22, 2018 including the specification, drawings and abstract is incorporated herein by reference in its entirety.

BACKGROUND

1. Technical Field

The disclosure relates to an electronic control unit, a monitoring method, and a non-transitory computer readable medium storing a program.

2. Description of Related Art

A monitoring device is known which regularly accesses an information processing unit connected to a network, and monitors the state, such as a malfunction, of the information processing unit.

For example, in a network management system that regularly accesses a network resource, and monitors its state, such as a malfunction, a technology for automatically optimizing the frequency of occurrence of management traffic according to the load of the network, so as to enhance the processing efficiency, is known (see, for example, Japanese Patent Application Publication No. 9-270794 (JP 9-270794 A)).

SUMMARY

In a monitoring system that monitors other electronic control units connected to an on-vehicle network, there may be some limitations to the resources, such as the processing speed and storage capacity, of an electronic control unit that monitors the other electronic control units, as well as the loads of the other electronic control units and network.

In this case, in the network management system as described in JP 9-270794 A, the state of the electronic control unit that monitors the other electronic control units is not taken into consideration. Thus, the other electronic control units may not be monitored, with settings appropriate to the states of the other electronic control units and the electronic control unit that monitors them.

The above situation may arise not only in the on-vehicle network, but may also be encountered in networks installed on aircrafts, ships, etc., and networks used for device control in factories, etc.

The disclosure provides an electronic control unit that can monitor another subject electronic control unit connected to a network, with settings appropriate to the states of the subject electronic control unit and the electronic control unit itself.

An electronic control unit according to a first aspect of the disclosure, which monitors a subject electronic control unit that is different from the electronic control unit and is connected to a network, includes a transmitting unit that transmits a monitoring packet to the subject electronic control unit, an estimating unit that estimates a state of the subject electronic control unit, based on a reply packet transmitted from the subject electronic control unit in response to the monitoring packet, and a monitoring unit that monitors the subject electronic control unit, based on a monitoring policy selected according to a combination of the state of the subject electronic control unit estimated by the estimating unit, and the state of the electronic control unit.

Thus, the electronic control unit can monitor the subject electronic control unit connected to the network, with settings appropriate to the states of the subject electronic control unit and the electronic control unit.

In the electronic control unit according to the above aspect of the disclosure, the monitoring unit may determine a transmission frequency at which the transmitting unit transmits the monitoring packet, based on the monitoring policy selected according to the combination of the state of the subject electronic control unit estimated by the estimating unit, and the state of the electronic control unit.

Thus, the electronic control unit can transmit the monitoring packet at an appropriate transmission frequency, based on the monitoring policy selected according to the states of the subject electronic control unit and the electronic control unit.

In the electronic control unit according to the above aspect of the disclosure, the monitoring policy may specify that monitoring data of the subject electronic control unit is not stored, when the state of the subject electronic control unit is a first state in which the subject electronic control unit need not be monitored.

Thus, when the subject electronic control unit is in the first state in which the subject electronic control unit need not be monitored, the monitoring data is not stored, and therefore, unnecessary monitoring data is less likely or unlikely to be stored.

In the electronic control unit as described above, the first state may include a state before start-up of the subject electronic control unit, or a state in which the subject electronic control unit is stopped.

Thus, the electronic control unit is less likely or unlikely to store unnecessary monitoring data, when the subject electronic control unit is in the state before start-up, or in the state in which it is stopped.

The electronic control unit according to the above aspect of the disclosure may be a relay device that relays communications between the subject electronic control unit and another electronic control unit in the network.

Thus, the electronic control unit can easily grasp change of the states of the subject electronic control unit and the electronic control unit, due to control from an external tool connected to the network.

In the electronic control unit as described above, the monitoring policy may specify that transmission of the monitoring packet to the subject electronic control unit is stopped, when the state of the electronic control unit is a second state in which the subject electronic control unit need not be monitored.

Thus, when the electronic control unit is in the second state in which the subject electronic control unit need not be monitored, the electronic control unit can curb transmission of unnecessary monitoring packets.

In the electronic control unit as described above, the second state may include a program data relaying state in which the electronic control unit relays a program for rewriting of the subject electronic control unit, or a program rewriting state in which the electronic control unit rewrites a program of the electronic control unit.

Thus, the electronic control unit can curb transmission of unnecessary monitoring packets, when the electronic control unit is in the program data relaying state, or in the program rewriting state.

In the electronic control unit according to the above aspect of the disclosure, the monitoring policy may specify that a transmission frequency of the monitoring packet is lowered, when a load of the subject electronic control unit is equal to or greater than a first threshold value.

Thus, when the load of the subject electronic control unit is high, the electronic control unit can reduce the load due to transmission of the reply packet by the subject electronic control unit.

In the electronic control unit according to the above aspect of the disclosure, the estimating unit may estimate a load of the subject electronic control unit, based on a reply time of the reply packet to the monitoring packet, or a packet loss rate of the reply packet relative to the monitoring packet.

In this manner, the electronic control unit can estimate the load of the subject electronic control unit connected via the network.

In the electronic control unit according to the above aspect of the disclosure, the monitoring policy may specify that a transmission frequency of the monitoring packet is lowered, when a load of the electronic control unit is equal to or greater than a second threshold value.

Thus, when the load of the electronic control unit is high, the load of the electronic control unit can be reduced by lowering the transmission frequency of the monitoring packet.

In the electronic control unit according to the above aspect of the disclosure, the network may be an on-vehicle network installed on a vehicle, and the electronic control unit may be a relay device that relays communications between the subject electronic control unit and another subject electronic control unit which control the vehicle.

Thus, the electronic control unit can reduce a possibility that the operation to transmit and receive the monitoring packet and reply packet to and from the subject electronic control unit becomes a non-negligible processing load, and has an influence on control of the vehicle performed by the subject electronic control unit.

A second aspect of the disclosure is a monitoring method that is performed by an electronic control unit that monitors a subject electronic control unit connected to a network. The monitoring method includes, transmitting a monitoring packet from the electronic control unit to the subject electronic control unit; estimating a state of the subject electronic control unit, based on a reply packet transmitted from the subject electronic control unit in response to the monitoring packet; and monitoring the subject electronic control unit, based on a monitoring policy selected according to a combination of the estimated state of the subject electronic control unit, and the state of the electronic control unit.

A third aspect of the disclosure is a non-transitory computer readable medium storing a program that causes an electronic control unit that monitors a subject electronic control unit that is different from the electronic control unit and is connected to a network, to execute a process. The process includes, transmitting a monitoring packet to the subject electronic control unit; estimating a state of the subject electronic control unit, based on a reply packet transmitted from the subject electronic control unit in response to the monitoring packet; and monitoring the subject electronic control unit, based on a monitoring policy selected according to a combination of the estimated state of the subject electronic control unit, and the state of the electronic control unit.

According to the above aspects of the disclosure, the electronic control unit can monitor the subject electronic control unit connected to the network, with settings appropriate to the states of the subject electronic control unit and the electronic control unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3B is a view showing an example of the functional configuration of the own ECU according to the embodiment;

FIG. 4A is a view useful for explaining the state of the other ECU and the state of the own ECU according to the embodiment;

FIG. 4B is a view useful for explaining the state of the other ECU and the state of the own ECU according to the embodiment;

FIG. 4C is a view useful for explaining the state of the other ECU and the state of the own ECU according to the embodiment;

FIG. 4D is a view useful for explaining the state of the other ECU and the state of the own ECU according to the embodiment;

FIG. 5 is a view showing an example of monitoring policy according to the embodiment;

FIG. 9A is a view useful for explaining one example of the monitoring process according to the embodiment;

FIG. 9B is a view useful for explaining one example of the monitoring process according to the embodiment;

FIG. 12A is a view useful for explaining another example of the monitoring process according to the embodiment.

FIG. 12B is a view useful for explaining another example of the monitoring process according to the embodiment.

DETAILED DESCRIPTION OF EMBODIMENTS

One embodiment of the disclosure will be described with reference to the drawings.

System Configuration

Figure 1:
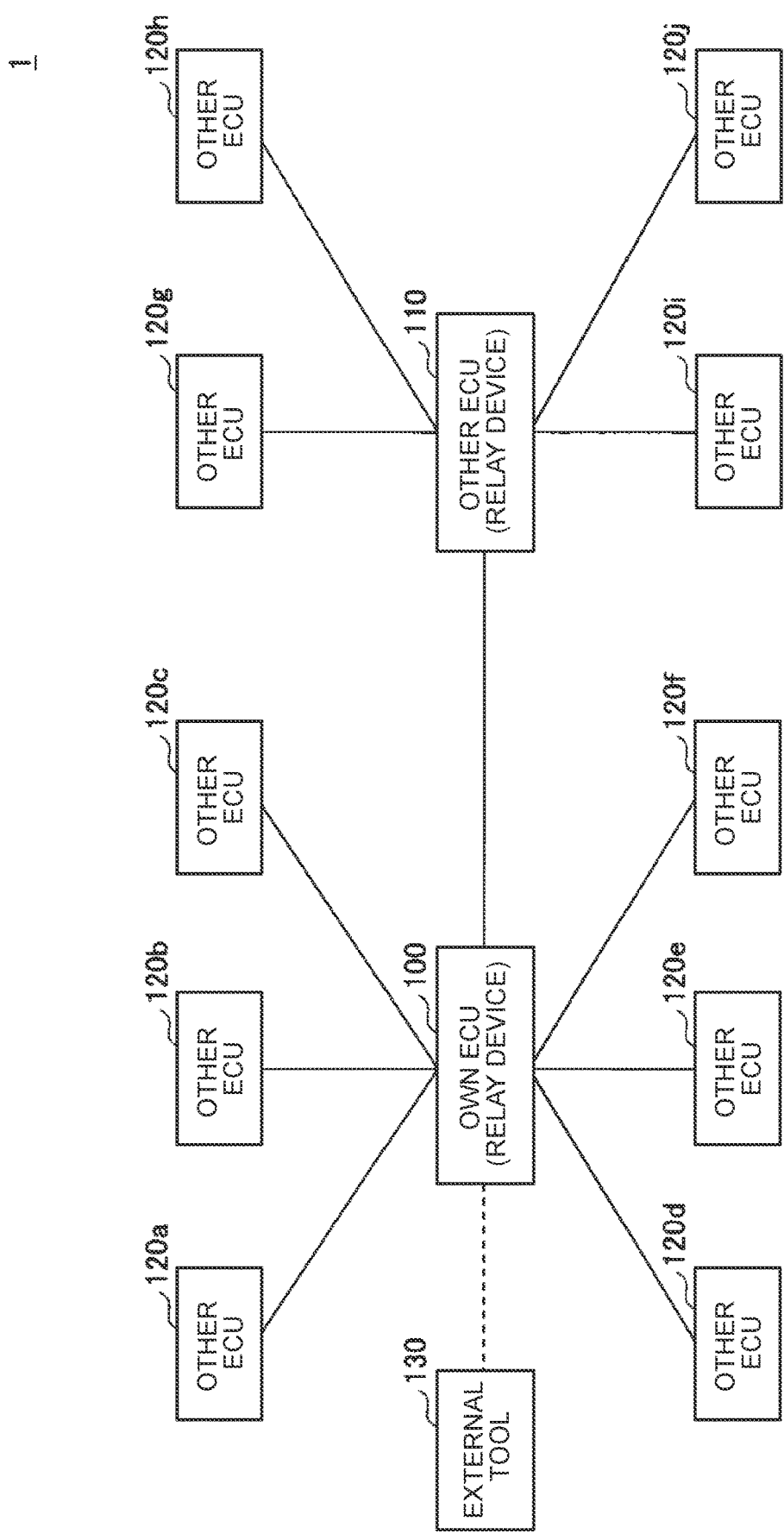
FIG. 1 is a view showing an example of the configuration of an on-vehicle network according to one embodiment.

FIG. 1 shows an example of the configuration of an on-vehicle network according to one embodiment. The on-vehicle network 1, which is installed on a vehicle, such as an automobile, is a communication network, such as on-vehicle Ethernet (registered trademark) that conducts communications according to the Ethernet protocol. In the example of FIG. 1, an own electronic control unit (ECU) 100 and another ECU 110, which function as relay devices, and two or more other ECUs 120a to 120j are connected to the on-vehicle network 1. In the following description, "other ECU" will be used to indicate any given ECU, as one of the other ECU 110, and the other ECUs 120a to 120j. Also, "other ECU 120" will be used to indicate any given ECU, as one of the other ECUs 120a to 120j. In this connection, the other ECU 110 corresponds to the "subject electronic control unit" of the disclosure.

Here, the "own ECU" denotes an electronic control unit (ECU) that regularly sends a monitoring packet to each of the other ECUs, and monitors its reply packet, so as to monitor the other ECU, and the "other ECU" denotes another electronic control unit (ECU) as a subject to be monitored by the own ECU.

The own ECU (relay device) 100 is an electronic control unit that monitors another ECU connected to the on-vehicle network 1. The own ECU 100 sends a monitoring packet to the other ECU at a given transmission frequency, monitors a reply packet transmitted from the other ECU in response to the monitoring packet, and stores monitoring data (log) in a storing unit. The monitoring data stored in the storing unit is read out, by means of an external tool 130, or the like, connected to the on-vehicle network 1, and is used for fault diagnosis for detecting a fault in the other ECU, for example.

In the example of FIG. 1, one of the relay devices included in the on-vehicle network 1 has the function of the own ECU 100. However, the disclosure is not limited to this arrangement, but another ECU, or another on-vehicle device, such as a multi-protocol gateway, connected to the on-vehicle network 1 may have the function of the own ECU 100.

The other ECU (relay device) 110 is a relay device, such as a switching hub, or a router, and relays communications between the other ECUs 120. In the following description, it is assumed that the relay device is a switching hub.

In the Ethernet, one-to-one communications are conducted between the other ECUs; thus, when communications are conducted among a plurality of other ECUs 120, a relay device, such as a switching hub, is provided. The number of the other ECUs 120 that can be connected to the switching hub is determined depending on the type of the switching hub, and may be four, six, or eight, for example. Thus, when the larger number of the other ECUs 120 are to be connected, an additional switching hub (e.g., another ECU 110) is provided. The switching hub is one example of relay device (own ECU 100, other ECU 110). The relay device may be another type of relay device, such as a router, or a repeater.

In the above configuration, the own ECU 100 transmits a monitoring packet to each of the other ECUs at a given transmission frequency (transmission intervals), monitors a reply packet transmitted from the other ECU, and stores monitoring data in the storing unit, or the like.

However, in the on-vehicle network 1, there may be some limitations to the resources, such as the processing speeds of the other ECUs and own ECU 100, and the capacity of the storing unit in which the own ECU 100 stores the monitoring data.

For example, a central processing unit (CPU) installed in the other ECU, or own ECU 100, may have lower processing power than a CPU installed in an information terminal, such as a general personal computer (PC). In this case, sending and receiving of the monitoring packets and reply packets may become a non-negligible processing load, and may have an influence on control of the vehicle performed by the other ECUs 120, for example.

Also, the storage area of the own ECU 100 in which the monitoring data is stored may be small. In this case, the own ECU 100 cannot store a large quantity of monitoring data, and monitoring data of one of the other ECUs in which a malfunction arises may overwrite monitoring data of the other ECUs, and may impede fault diagnosis, for example.

Accordingly, it is desirable for the own ECU 100 to curb transmission of unnecessary monitoring packets, and also curb storing of unnecessary monitoring data, for example.

Thus, the own ECU 100 according to this embodiment transmits a monitoring packet to another ECU, and estimates the state (operating state, load, etc.) of the other ECU, based on a reply packet which the other ECU transmits in response to the monitoring packet. Also, the own ECU 100 monitors the other ECU, based on a monitoring policy selected according to a combination of the estimated state of the other ECU, and the state (operating state, load, etc.) of the own ECU 100. The monitoring policy specifies the transmission frequency of the monitoring packet, and whether the monitoring data is to be stored, according to the combination of the state of the other ECU and the state of the own ECU 100.

Preferably, when the other ECU is in a first state (e.g., before start-up, currently stopped, currently at fault, etc.) in which the other ECU need not be monitored, the monitoring policy specifies that the monitoring data is not stored, for example. Thus, the own ECU 100 can curb storing of unnecessary monitoring data.

Preferably, when the own ECU 100 is in a second state (e.g., in a program data relay mode, in a program rewriting mode, etc.) in which the own ECU 100 need not monitor other ECUs, the monitoring policy specifies that transmission of the monitoring packet is stopped, for example. Thus, the own ECU 100 can curb transmission of unnecessary monitoring packets.

Preferably, when the load of the own ECU 100 or other ECU is high, the monitoring policy specifies that the transmission frequency of the monitoring packet is reduced, for example. Thus, the own ECU 100 can reduce an influence on control of the vehicle performed by the other ECU, due to the processing load produced by sending and receiving of the monitoring packets and reply packets of the own ECU 100 and other ECU, for example.

Thus, according to this embodiment, the own ECU 100 that monitors another ECU connected to the on-vehicle network 1 can monitor the other ECU, with settings appropriate to the states of the other ECU and the own ECU 100.

The on-vehicle network 1 as shown in FIG. 1 is one example of network according to this embodiment. The network according to this embodiment is not limited to the on-vehicle network 1, but may be a network installed on an aircraft, ship, or the like, or a network used for equipment control in a factory, etc. The function of the own ECU 100 may also be implemented by other on-vehicle devices, such as the other ECU 110, and other ECUs 120.

Hardware Configuration

Next, the hardware configuration of the own ECU 100 and other ECUs 110, 120 according to this embodiment will be described.

Figure 2:
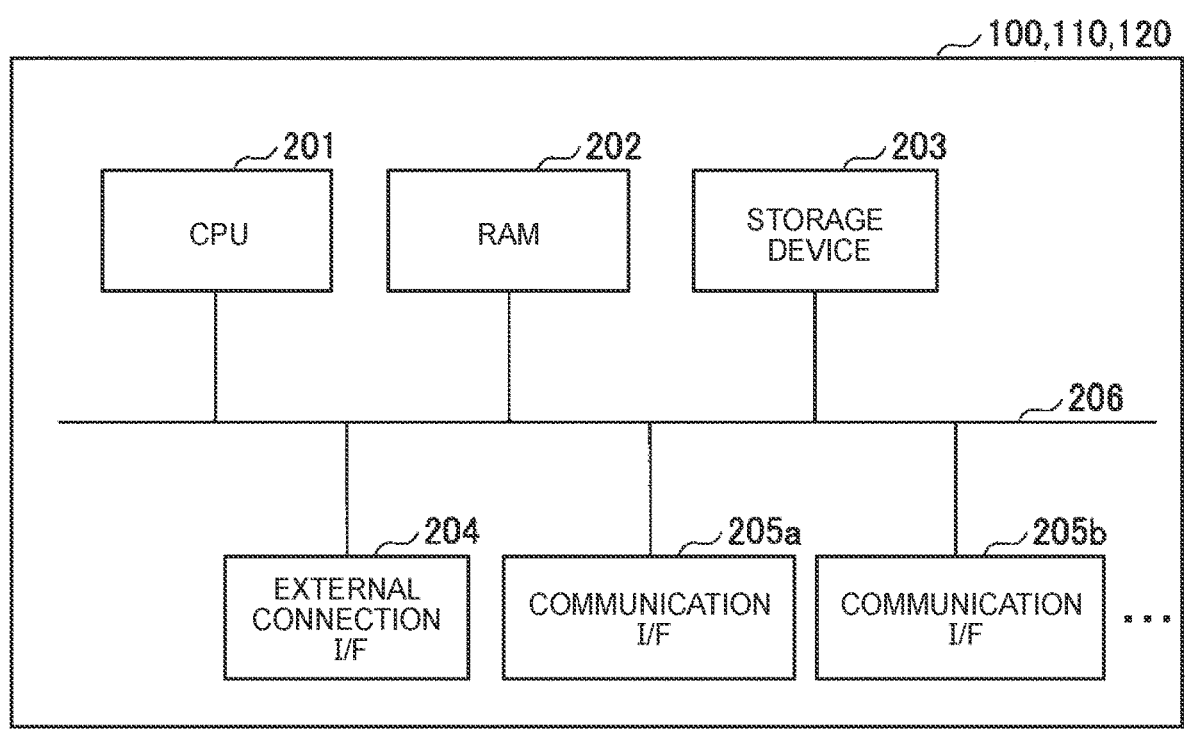
FIG. 2 is a view showing an example of the hardware configuration of an own electronic control unit (ECU) and other electronic control units (ECUs) according to the embodiment.

FIG. 2 shows an example of the hardware configuration of the own ECU and other ECUs according to this embodiment. Each of the own ECU 100, and other ECUs 110, 120 has the configuration of a general computer. Here, the own ECU 100 will be described by way of example.

The own ECU 100 has a CPU 201, random access memory (RAM) 202, storage device 203, external connection interface (I/F) 204, communication I/Fs 205a, 205b, . . . , system bus 206, and so forth. In the following description, "communication I/F 205" will be used for indicating any given communication I/F, as one of the communication I/Fs 205a, 205b, . . . . Also, the communication I/Fs 205 are respectively provided for two or more network ports provide in the own ECU 100.

The CPU 201 is a computing device that reads programs, data, etc. stored in the storage device 203, etc., onto the RAM 202, and executes the programs, etc., so as to implement each function of the own ECU 100. The RAM 202 is a volatile memory used as a work area of the CPU 201. The storage device 203 is a non-volatile memory that stores an operating system (OS), programs, monitoring data, and so forth.

The external connection I/F 204 is an interface for connecting an external device to the own ECU 100. Examples of the external device may include various types of storage media, external tool 130, and so forth. In this connection, the external tool 130 may be connected to the communication I/F 205.

The communication I/F 205 is a network port that connects the own ECU 100 with another ECU, or a network device, such as the external tool 130. The system bus 206 is connected in common to the respective constituent elements as described above, and transmits address signals, data signals, various control signals, and so forth.

The hardware configuration of the other ECUs 120, and the other ECU 110 may be similar to that of the own ECU 100. The other ECU 120 may include one communication I/F 205. Also, the other ECU 120 may further include a display unit, input unit, or voice output unit, for example.

Functional Configuration

Figure 3A:
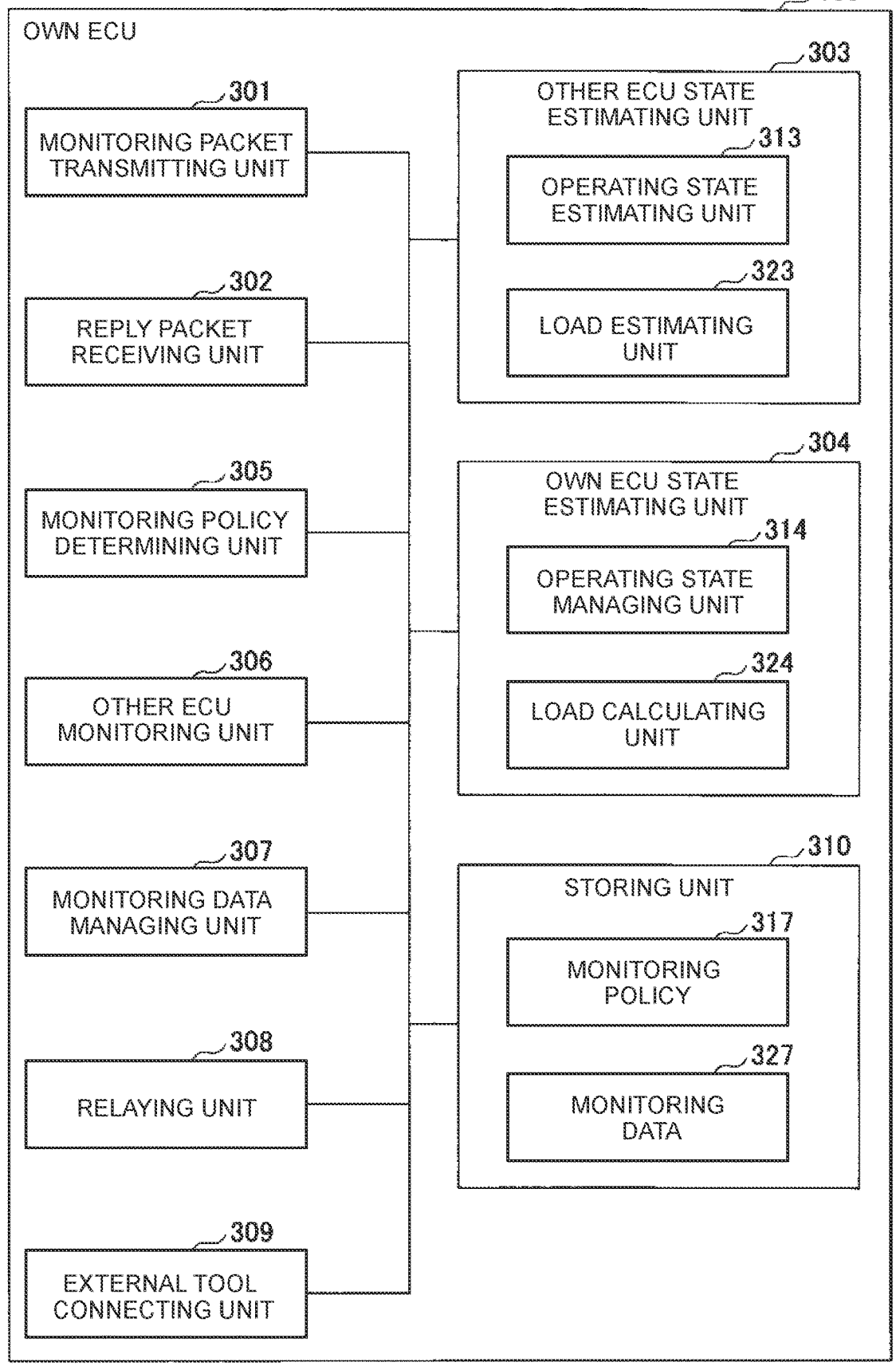
FIG. 3A is a view showing an example of the functional configuration of the own ECU according to the embodiment.

Next, the functional configuration of the own ECU 100 will be described. FIG. 3A and FIG. 3B show an example of the functional configuration of the own ECU 100 according to this embodiment. Initially, each unit of the functional configuration will be described, referring to FIG. 3A.

The own ECU 100 has a monitoring packet transmitting unit 301, reply packet receiving unit 302, other ECU state estimating unit 303, own ECU state estimating unit 304, monitoring policy determining unit 305, other ECU monitoring unit 306, monitoring data managing unit 307, relaying unit 308, external tool connecting unit 309, storing unit 310, and so forth.

The CPU 201 of the own ECU 100 executes a given program stored in the storage device 203 of FIG. 2, for example, so as to implement each unit of the functional configuration as indicated above. At least a part of the functional units of the own ECU 100 may be implemented by hardware.

The monitoring packet transmitting unit (transmitting unit) 301 transmits a monitoring packet to another ECU to be monitored (which will also be called "subject ECU"). For example, the monitoring packet transmitting unit 301 transmits the monitoring packet to the other ECU to be monitored, at a given transmission frequency (transmission intervals).

Preferably, the monitoring packet transmitting unit 301 sends the monitoring packet, at a transmission frequency according to a monitoring policy selected by the monitoring policy determining unit 305 that will be described later.

The reply packet receiving unit 302 receives a reply packet transmitted from the other ECU, in response to the monitoring packet transmitted by the monitoring packet transmitting unit 301.

As one example, general "ping" may be used for sending and receiving of the monitoring packets and reply packets. According to the "ping", an "echo request" packet (one example of the monitoring packet) of the Internet Control Message Protocol (ICMP) is transmitted to a target to be monitored. Also, the presence of connection of the target to be monitored can be checked by determining whether an "echo reply" packet (one example of the reply packet) transmitted from the target to be monitored has been received. It is also possible to check the reply time, etc. of the target to be monitored, based on a length of time from the time when the "echo request" packet is transmitted, to the time when the "echo reply" packet is received.

The other ECU state estimating unit (estimating unit) 303 estimates the state (operating state, load, etc.) of the other ECU, based on the reply packet transmitted by the other ECU, in response to the monitoring packet transmitted by the monitoring packet transmitting unit 301. The other ECU state estimating unit 303 includes an operating state estimating unit 313, and a load estimating unit 323, for example.

The operating state estimating unit 313 estimates the operating state of the other ECU, based on the reply packet transmitted by the other ECU, in response to the monitoring packet transmitted by the monitoring packet transmitting unit 301. Examples of the operating state of the other ECU include "currently stopped", "before start-up", "in normal operation", "currently at fault", etc. as shown in FIG. 4A.

The "currently stopped" means a state in which a vehicle power supply (such as an ignition power supply) is OFF. When the other ECU is "currently stopped", the own ECU 100 need not monitor the other ECU.

The "before start-up" means a state from the time when the vehicle power supply is turned ON, to the time when the own ECU 100 transmits a monitoring packet while disabling storing of monitoring data, and receives a reply packet from the other ECU for the first time. "Before start-up" of the other ECU, the own ECU 100 need not monitor the other ECU.

The operating states of "currently stopped" and "before start-up" are examples of the first state in which the own ECU 100 need not monitor the other ECU.

The "in normal operation" means a state after the vehicle power supply is turned ON, and the own ECU 100 receives the reply packet from the other ECU for the first time, and also a state in which the other ECU is not at fault. The other ECU "in normal operation" becomes a target to be monitored by the own ECU 100, and the monitoring packet is transmitted to the other ECU.

The "currently at fault" means a state after the vehicle power supply is turned ON, and the own ECU 100 receives the reply packet from the other ECU for the first time, and also a state in which the load of the other ECU is equal to or larger than a threshold value. As one example, when the monitoring packet starts being transmitted, and the reply packet cannot be received a predetermined number of times or more, or the loss rate of the reply packet is equal to or larger than a threshold value, the operating state estimating unit 313 estimates the state of the other ECU as "currently at fault".

The load estimating unit 323 estimates the load of the other ECU, based on the reply packet transmitted by the other ECU, in response to the monitoring packet transmitted by the monitoring packet transmitting unit 301. For example, the load estimating unit 323 estimates the load of the other ECU, based on "monitoring reply time", or "monitoring packet loss rate", as shown in FIG. 4B.

The "monitoring reply time" is a difference between the transmission clock time at which the monitoring packet transmitting unit 301 transmitted the monitoring packet to the other ECU, and the receiving clock time at which the reply packet receiving unit 302 received the reply packet transmitted by the other ECU in response to the monitoring packet. For example, the load estimating unit 323 presumes that the load of the other ECU is high, when the "monitoring reply time" is equal to or greater than a threshold value.

The "monitoring packet loss rate" is a rate at which the own ECU 100 could not receive the reply packet within a given period of time, after the monitoring packet transmitting unit 301 transmitted the monitoring packet to the other ECU. For example, the load estimating unit 323 presumes that the load of the other ECU is high, when the "monitoring packet loss rate" is equal to or larger than a threshold value (first threshold value). The threshold value of the "monitoring reply time" and the threshold value of the "monitoring packet loss rate" are examples of the first threshold value used for determining that the load of the other ECU is high.

In the above manner, the other ECU state estimating unit 303 estimates the operating state of the other ECU, and the load of the other ECU, based on the reply packet transmitted by the other ECU in response to the monitoring packet transmitted by the monitoring packet transmitting unit 301.

The own ECU state estimating unit 304 manages the state (operating state, load, etc.) of the own ECU 100. The own ECU state estimating unit 304 includes an operating state managing unit 314, and a load calculating unit 324, for example.

The operating state managing unit 314 manages the operating state of the own ECU 100. Examples of the operating state of the own ECU 100 include "currently stopped", "before start-up", and "in operation", as shown in FIG. 4C. Also, the state "in operation" includes "factory mode", "program data relay mode", "program rewriting mode", and "normal operating mode", for example.

The "currently stopped" means a state in which the vehicle power supply is OFF. The "before start-up" means a state from the time when the vehicle power supply is turned ON, to the time when the own ECU 100 transmits a monitoring packet. The "in operation" means a state in which the vehicle power supply is ON, and the own ECU 100 is sending the monitoring packet.

The "factory mode" means an operating state that is set in a factory, or the like, where vehicles are manufactured, and a state in which the on-vehicle network 1 operates in the factory mode. The operating state managing unit 314 determines that the operating state of the own ECU 100 is "factory mode", when a factory mode flag stored in the storage device 203, or the like, is set to ON, for example.

The "program data relay mode" means a state in which the own ECU 100 is relaying a program for rewriting a program of the other ECU. As shown in FIG. 4C, for example, the operating state managing unit 314 determines that the operating state of the own ECU 100 is the "program data relay mode", when a command to relay program data is generated from the external tool 130 while the factory mode flag is OFF, and the potential of a control signal is "High". In this case, it is deemed unnecessary for the own ECU 100 to monitor the other ECU, since the other ECU is rewriting its program.

Here, the control signal is used for detecting connection of the external tool 130 to the own ECU 100. The potential of the control signal is at a "High" level when the external tool 130 is connected to the own ECU 100, and is at a "Low" level when the external tool 130 is not connected.

The "program rewriting mode" means an operating state in which the own ECU 100 is rewriting a program of its own device, or is preparing for rewriting of a program. As shown in FIG. 4C, for example, the operating state managing unit 314 determines that the operating state of the own ECU 100 is "the program rewriting mode", when a command to rewrite a program is generated from the external tool 130, in a condition where the factory mode flag is "OFF", and the potential of the control signal is "High". In this case, the own ECU 100, which is rewriting the program, need not monitor the other ECU 120, or it may be difficult for the own ECU 100 to monitor the other ECU 120.

The "program data relay mode (program data relaying state)", and "program rewriting mode (program rewriting state)" are examples of the second state in which the own ECU 100 need not monitor the other ECU.

The "normal operating mode" means a state (state in which the own ECU 100 operates normally) in which the own ECU 100 is sending a monitoring packet, and is not in any other state, after the vehicle power supply is turned ON. As shown in FIG. 4C, for example, the operating state managing unit 314 determines that the operating state of the own ECU 100 is "the normal operating mode" when the factory mode flag is set to "OFF", and the potential of the control signal is "Low".

The load calculating unit 324 calculates the load of the own ECU 100. For example, the load calculating unit 324 calculates the "CPU load", "memory usage rate", "network bandwidth usage rate", etc. of the own ECU 100, as shown in FIG. 4D.

The "CPU load" is information indicating the load of the CPU 201 of the own ECU 100, and is represented by the usage rate, or the like, of the CPU. The own ECU 100 can determine that the load of the own ECU 100 is high, when the "CPU load" is equal to or larger than a threshold value (second threshold value).

The "memory usage rate" is represented by the rate of the storage capacity that is being used, with respect to the storage capacity of a memory (e.g., RAM 202) of the own ECU 100. The own ECU 100 can determine that the load of the own ECU 100 is high, when the "memory usage rate" is equal to or larger than a threshold value (second threshold value).

The "network bandwidth usage rate" is information indicating a network bandwidth that is being used by the own ECU 100. The own ECU 100 determines that the load of the own ECU 100 is high, when the "network bandwidth usage rate" is equal to or larger than a threshold value (second threshold value), for example. The threshold values of the "CPU load", "memory usage rate", and "network bandwidth usage rate" are examples of the second threshold value used for determining that the load of the own ECU 100 is high.

In the above manner, the own ECU state estimating unit 304 manages the operating state of the own ECU 100, and the load of the own ECU 100.

The monitoring policy determining unit 305 selects a monitoring policy corresponding to a combination of the state of the other ECU estimated by the other ECU state estimating unit 303, and the state of the own ECU 100 managed by the own ECU state estimating unit 304.

FIG. 5 shows an example of the monitoring policy according to this embodiment. As shown in FIG. 5, in the monitoring policy 317, the monitoring policy (the transmission frequency of the monitoring packet, storing of monitoring data, etc.) is set in advance, in association with the state (operating state, load) of the own ECU, and the state (operating state, load) of the other ECU. The monitoring policy determining unit 305 selects a monitoring policy corresponding to the combination of the state of the own ECU 100 and the state of the other ECU, using the monitoring policy 317.

Suppose the state of the own ECU 100 is the "normal operating mode", and the load of the own ECU 100 is "lower than the threshold value", while the state of the other ECU is "currently stopped", for example. In this case, the monitoring policy determining unit 305 selects a monitoring policy that sets the transmission frequency of the monitoring packet to "transmission stopped", and "disables" storing of monitoring data, from the monitoring policy 317 shown in FIG. 5.

Also, suppose the state of the own ECU 100 is the "normal operating mode", and the load of the own ECU 100 is "equal to or higher than the threshold value", while the state of the other ECU is "in normal operation". In this case, the monitoring policy determining unit 305 selects a monitoring policy that sets the transmission frequency of the monitoring packet to a "specified frequency or lower", and "disables" storing of monitoring data, from the monitoring policy 317 shown in FIG. 5.

Further, suppose that the operating state of the own ECU 100 is the "program data relay mode", or "program rewriting mode". In this case, the monitoring policy determining unit 305 selects a monitoring policy that sets the transmission frequency of the monitoring packet to "transmission stopped", and "disables" storing of monitoring data, from the monitoring policy 317 shown in FIG. 5.

The other ECU monitoring unit 306 makes an abnormality determination on the other ECU, using the load of the other ECU estimated by the load estimating unit 323 of the other ECU state estimating unit 303. As one example, the other ECU monitoring unit 306 determines that the other ECU from which the reply packet cannot be received a predetermined number of times or more is an abnormal ECU. Also, the other ECU monitoring unit 306 informs the monitoring data managing unit 307 of monitoring results including information that specifies the other ECU 120 determined as an abnormal ECU, clock time (abnormality determination time) at which the other ECU 120 was determined to be abnormal, and duration (reply packet non-receiving period) of a condition where the reply packet cannot be received, for example.

The monitoring data managing unit 307 manages the monitoring data 327 stored in the storing unit 310. For example, the monitoring data managing unit 307 stores the monitoring results obtained from the other ECU monitoring unit 306, in the monitoring data 327, based on the monitoring policy. Also, the monitoring data managing unit 307 outputs the monitoring data 327 stored in the storing unit 310, to the external tool 130, in response to a request from the external tool 130, for example.

The storing unit 310 is implemented by a program executed by the CPU 201 of FIG. 2, and the storage device 203, for example, and stores the monitoring policy 317, monitoring data 327, and so forth.

The relaying unit 308 functions as a relay device that relays communications between other ECUs. Where the own ECU 100 is an ECU other than the relay device, the own ECU 100 may not have the relaying unit 308.

The external tool connecting unit 309 authenticates the external tool 130 connected to the own ECU 100, for example, and permits connection of the external tool 130 that has been successfully authenticated, to the on-vehicle network 1.

Next, the flow of information among the units of the functional configuration will be described, using FIG. 3B.

The own ECU state estimating unit 304 estimates the operating state of the own ECU 100, based on ON/OFF of the vehicle power supply, control signal obtained from the external tool connecting unit 309, and the factory mode flag, and estimates the load of the own ECU 100. The own ECU state estimating unit 304 also informs the monitoring policy determining unit 305 of the estimated state (operating state, load) of the own ECU.

The other ECU state estimating unit 303 estimates the load of the other ECU, and the operating state of the other ECU, based on the reply packet received by the reply packet receiving unit 302, and ON/OFF of the vehicle power supply. The other ECU state estimating unit 303 also informs the monitoring policy determining unit 305 of the estimated load of the other ECU, and the operating state of the other ECU, and informs the other ECU monitoring unit 306 of the estimated load of the other ECU.

The monitoring policy determining unit 305 selects the monitoring policy, according to the combination of the state (operating state, load) of the own ECU 100 obtained from the own ECU state estimating unit 304, and the state (operating state, load) of the other ECU obtained from the other ECU state estimating unit 303. Also, the monitoring policy determining unit 305 informs the monitoring packet transmitting unit 301 of the transmission frequency of the monitoring packet, and informs the monitoring data managing unit 307 whether storing of the monitoring data is enabled or disabled, according to the selected monitoring policy.

The other ECU monitoring unit 306 makes an abnormality determination on the other ECU, based on the load of the other ECU obtained from the other ECU state estimating unit 303, in parallel with the above processing of the monitoring policy determining unit 305. For example, the other ECU monitoring unit 306 determines the other ECU from which the reply packet cannot be received the predetermined number of times or more, as an abnormal ECU, and informs the monitoring data managing unit 307 of the information that specifies the other ECU 120 determined as the abnormal ECU, abnormality determination time, and reply packet non-receiving period.

According to the monitoring policy selected by the monitoring policy determining unit 305, the monitoring data managing unit 307 stores the information obtained from the other ECU monitoring unit 306, in the storing unit 310, when storing of the monitoring data is enabled.

Next, the flow of processing of the monitoring method performed by the own ECU 100 according to this embodiment will be described.

Figure 6:
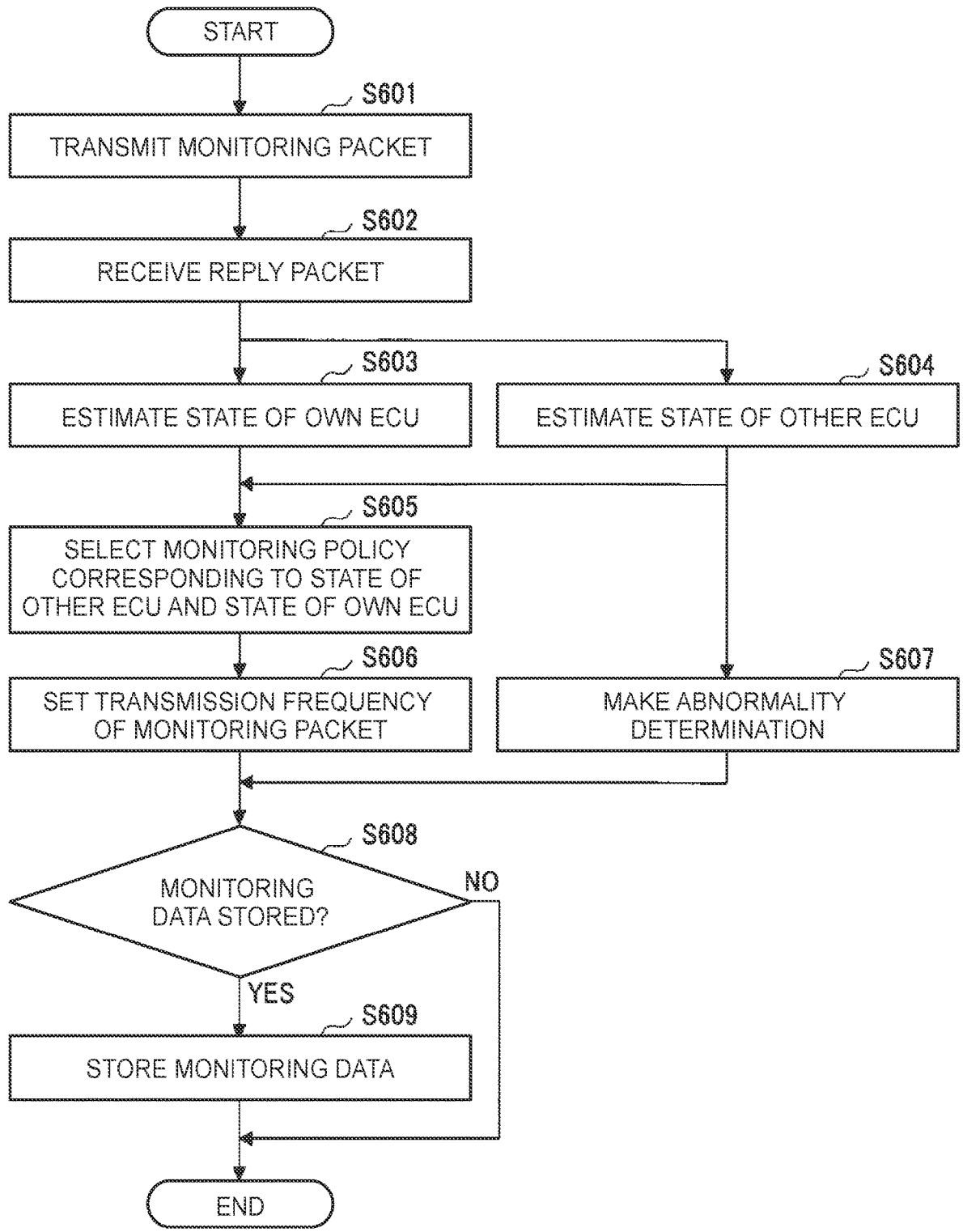
FIG. 6 is a flowchart illustrating the flow of processing of the own ECU according to the embodiment.

FIG. 6 is a flowchart illustrating the flow of processing of the own ECU according to the embodiment. The own ECU 100 repeatedly performs a monitoring process shown in FIG. 6, on each of other ECUs connected to the on-vehicle network 1, for example.

In step S601, the monitoring packet transmitting unit 301 of the own ECU 100 transmits the monitoring packet to another ECU at a given transmission frequency (transmission intervals).

In step S602, the reply packet receiving unit 302 of the own ECU 100 receives the reply packet transmitted by the other ECU, in response to the monitoring packet transmitted by the monitoring packet transmitting unit 301.

In step S603, the own ECU state estimating unit 304 of the own ECU 100 estimates the state (operating state, and load) of the own ECU 100. For example, the own ECU state estimating unit 304 obtains the operating state of the own ECU 100, using the operating state managing unit 314, and calculates the load ("CPU load", "memory usage rate", "network bandwidth usage rate", etc.) of the own ECU 100, using the load calculating unit 324.

In step S604, the other ECU state estimating unit 303 of the own ECU 100 estimates the state (operating state, and load) of the other ECU 120, based on the reply packet received from the reply packet receiving unit 302, in parallel with the operation of step S603. For example, the other ECU state estimating unit 303 estimates the operating state of the other ECU 120, using the operating state estimating unit 313, and estimates the load of the other ECU, using the load estimating unit 323.

In step S605, the monitoring policy determining unit 305 of the own ECU 100 selects the monitoring policy corresponding to the combination of the state of the other ECU estimated by the other ECU state estimating unit 303, and the state of the own ECU 100 estimated by the own ECU state estimating unit 304. For example, the monitoring policy determining unit 305 obtains the monitoring policy corresponding to the state (operating state, load, etc.) of the other ECU, and the state (operating state, load, etc.) of the own ECU 100, from the monitoring policy 317 as shown in FIG. 5.

In step S606, the monitoring policy determining unit 305 determines and sets the transmission frequency of the monitoring packet transmitted by the monitoring packet transmitting unit 301, according to the obtained monitoring policy. For example, when the transmission frequency of the monitoring packet is "equal to or lower than the specified frequency", under the obtained monitoring policy, the monitoring policy determining unit 305 sets the transmission frequency of the monitoring packet transmitted from the monitoring packet transmitting unit 301 to the other ECU, to a lower value than the specified transmission frequency. Also, when the transmission frequency of the monitoring packet is "transmission stopped", under the obtained monitoring policy, the monitoring policy determining unit 305 stops transmission of the monitoring packet from the monitoring packet transmitting unit 301 to the other ECU.

In step S607, the other ECU monitoring unit 306 of the own ECU 100 makes an abnormality determination on the other ECU, based on the load of the other ECU obtained from the other ECU state estimating unit 303, in parallel with the operation of steps S605, S606. For example, the other ECU monitoring unit 306 determines the other ECU from which the reply packet cannot be received a predetermined number of times or more, as an abnormal ECU, and informs the monitoring data managing unit 307 of the information that specifies the other ECU 120 determined as the abnormal ECU, abnormality determination time, and reply packet non-receiving period.

In step S608, the monitoring data managing unit 307 of the own ECU 100 determines whether the monitoring data is to be stored, according to the monitoring policy selected by the monitoring policy determining unit 305. For example, when the function of storing the monitoring data is "enabled", under the monitoring policy selected by the monitoring policy determining unit 305, the monitoring data managing unit 307 determines that the monitoring data is stored, and the own ECU 100 proceeds to step S609. On the other hand, when the function of storing the monitoring data is "disabled", under the obtained monitoring policy, the monitoring data managing unit 307 determines that the monitoring data is not stored, and the process of FIG. 6 ends.

When the own ECU 100 proceeds to step S609, the monitoring data managing unit 307 stores the monitoring results including the information that specifies the other ECU determined as the abnormal ECU, abnormality determination time, reply packet non-receiving period, etc., in the monitoring data 327 of the storing unit 310.

Through the above process, the own ECU 100 is able to monitor the other ECU, with settings appropriate to the states of the other ECU and the own ECU 100.

Figure 7:
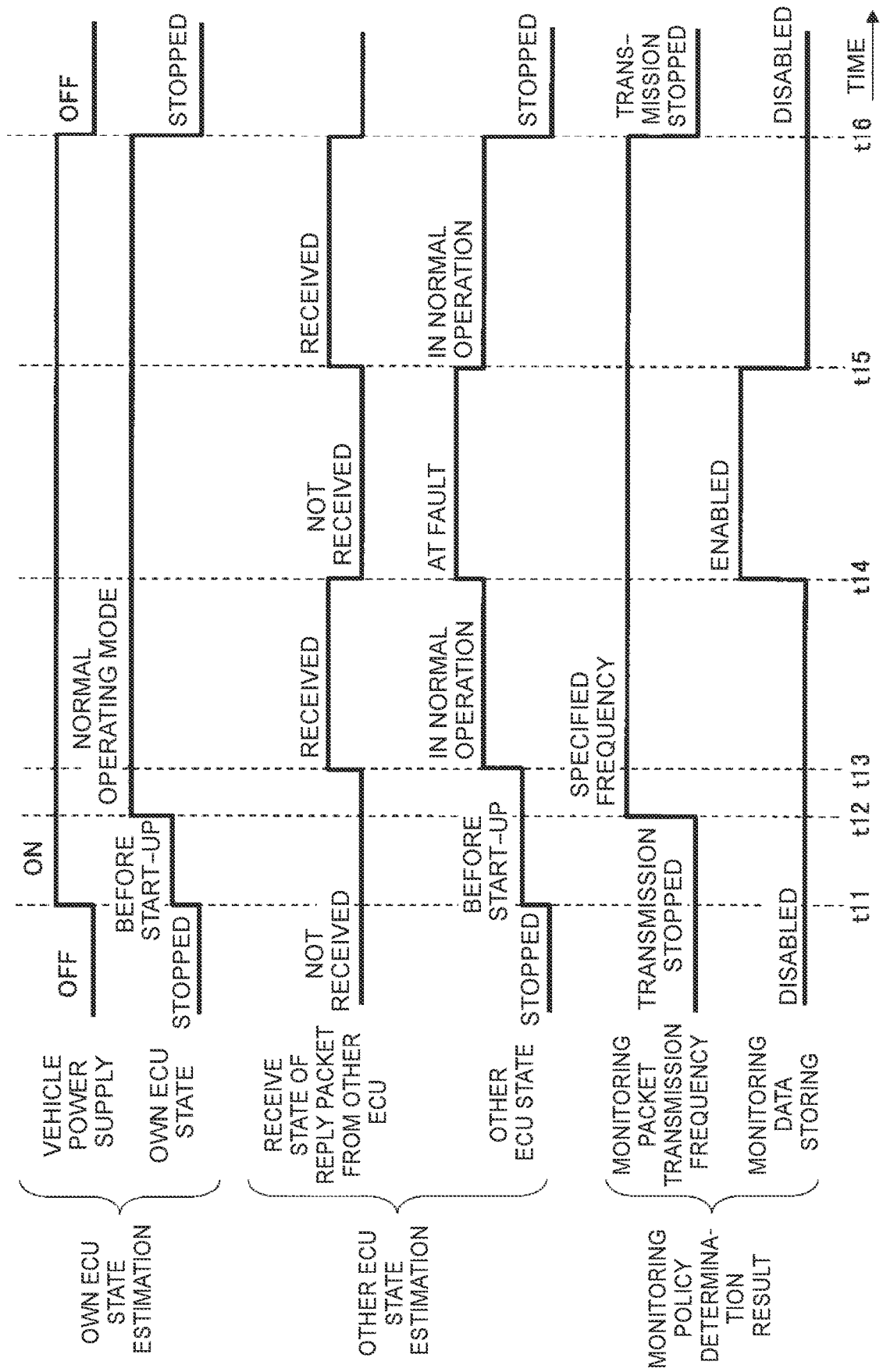
FIG. 7 is a view useful for explaining one example of a monitoring process according to the embodiment.
Figure 8:
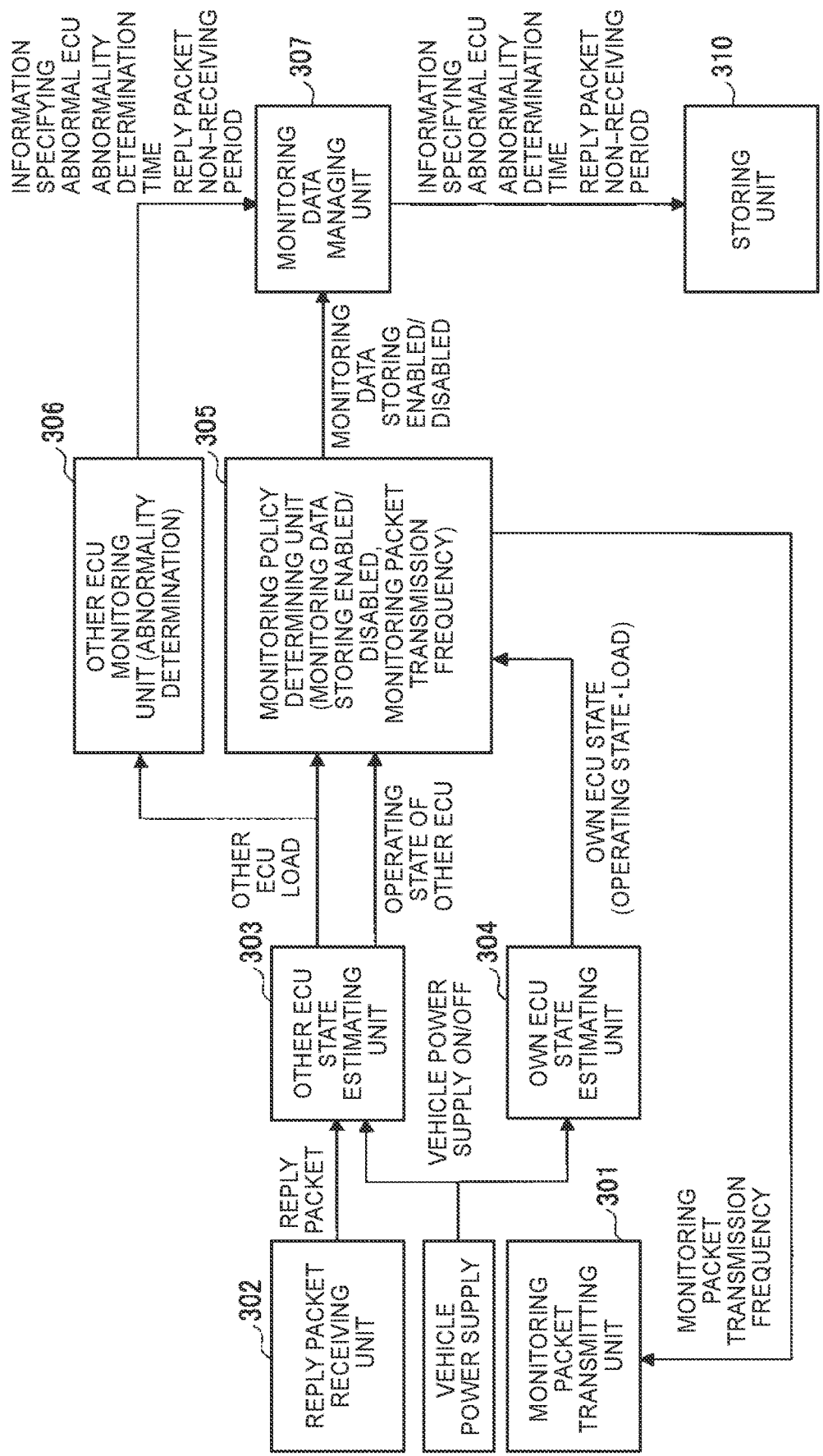
FIG. 8 is a view useful for explaining one example of the monitoring process according to the embodiment.

Referring to FIG. 7 to FIG. 9B, one example of monitoring process according to this embodiment will be described. These figures illustrate one example of specific operation according to the monitoring process shown in FIG. 6, for example. Here, as shown in FIG. 8, the process is performed, using a part of the configuration shown in FIG. 3B. For example, in the example of FIG. 8, the external tool connecting unit 309 shown in FIG. 3B is omitted. Also, in the example of FIG. 9A and FIG. 9B, calculation of the load of the own ECU by the own ECU state estimating unit 304 is omitted.

In the example shown in FIG. 9A, the operating state of the own ECU is one of three operating states, i.e., "currently stopped", "before start-up", and "normal operating mode". Also, the operating state of the other ECU is one of four operating states, i.e., "currently stopped", "before start-up", "in normal operation", and "currently at fault", as shown in FIG. 4A. Further, the monitoring policy 317 as shown in FIG. 9B is stored in the storing unit 310.

In this condition, if the vehicle power supply is turned ON at time t11, as shown in FIG. 7, the own ECU state estimating unit 304 of FIG. 8 estimates the operating state of the own ECU as "before start-up", and the other ECU state estimating unit 303 estimates the operating state of the other ECU as "before start-up". At this time, since the state of the own ECU 100 is "before start-up", the monitoring policy determining unit 305 of FIG. 8 selects the monitoring policy that sets the transmission frequency of the monitoring packet to "transmission stopped", and "disables" storing of the monitoring data, from the monitoring policy 317 shown in FIG. 9B.

Then, at time t12 of FIG. 7, when the own ECU 100 proceeds to the "normal operating mode", the own ECU state estimating unit 304 of FIG. 8 estimates the operating state of the own ECU as "normal operating mode", and the other ECU state estimating unit 303 estimates the operating state of the other ECU as "before start-up". At this time, since the state of the own ECU 100 is "normal operating mode", and the state of the other ECU is "before start-up", the monitoring policy determining unit 305 selects the monitoring policy that sets the transmission frequency of the monitoring packet to the "specified frequency", and "disables" storing of the monitoring data, from the monitoring policy 317. As a result, the monitoring packet transmitting unit 301 starts transmitting the monitoring packet at the specified transmission frequency.

When the reply packet receiving unit 302 of FIG. 8 receives the reply packet from the other ECU, at time t13 of FIG. 7, the own ECU state estimating unit 304 of FIG. 8 estimates the operating state of the own ECU as "normal operating mode", and the other ECU state estimating unit 303 estimates the operating state of the other ECU as "in normal operation". At this time, since the state of the own ECU 100 is "normal operating mode", and the state of the other ECU is "in normal operation", the monitoring policy determining unit 305 selects the monitoring policy that sets the transmission frequency of the monitoring packet to the "specified frequency", and "disables" storing of the monitoring data, from the monitoring policy 317.

When the reply packet receiving unit 302 of FIG. 8 becomes unable to receive the reply packet from the other ECU, at time t14 of FIG. 7, the own ECU state estimating unit 304 of FIG. 8 estimates the operating state of the own ECU as "normal operating mode", and the other ECU state estimating unit 303 estimates the operating state of the other ECU as "currently at fault". At this time, since the state of the own ECU 100 is "normal operating mode", and the state of the other ECU is "currently at fault", the monitoring policy determining unit 305 selects the monitoring policy that sets the transmission frequency of the monitoring packet to the "specified frequency", and "enables" storing of the monitoring data, from the monitoring policy. As a result, the monitoring data managing unit 307 of FIG. 8 stores the information that specifies the abnormal ECU, abnormality determination time, reply packet non-receiving period, etc., in the storing unit 310.

When the reply packet receiving unit 302 of FIG. 8 becomes able to receive the reply packet from the other ECU, at time t15 of FIG. 7, the own ECU state estimating unit 304 of FIG. 8 estimates the operating state of the own ECU as "normal operating mode", and the other ECU state estimating unit 303 estimates the operating state of the other ECU as "in normal operation". At this time, since the state of the own ECU 100 is "normal operating mode", and the state of the other ECU is "in normal operation", the monitoring policy determining unit 305 selects the monitoring policy that sets the transmission frequency of the monitoring packet to the "specified frequency", and "disables" storing of the monitoring data, from the monitoring policy 317.

When the vehicle power supply is turned OFF at time t16 of FIG. 7, the own ECU state estimating unit 304 of FIG. 8 estimates the operating state of the own ECU as "currently stopped", and the other ECU state estimating unit 303 estimates the operating state of the other ECU as "currently stopped". At this time, since the state of the own ECU 100 is "currently stopped", the monitoring policy determining unit 305 of FIG. 8 selects the monitoring policy that sets the transmission frequency of the monitoring packet to "transmission stopped", and "disables" storing of the monitoring data, from the monitoring policy 317 shown in FIG. 9B.

Thus, when the operating state of the other ECU, which is "currently at fault", is detected while the own ECU 100 is operating in the normal operating mode, fault information on the other ECU can be stored in the storing unit 310.

Referring to FIG. 10 to FIG. 12B, another example of monitoring process according to the embodiment will be described. These figures illustrate one example of specific operation according to the monitoring process shown in FIG. 6, for example. Here, as shown in FIG. 12A and FIG. 12B, the process is performed, using a part of the configuration shown in FIG. 3B. For example, in the example of FIG. 12A and FIG. 12B, calculation of the load of the own ECU by the own ECU state estimating unit 304 is omitted.

As shown in FIG. 12A, the state of the own ECU is one of four operating states, i.e., "currently stopped", "before start-up", "in program data relay mode", and "normal operating mode". Also, the operating state of the other ECU is one of four operating states, i.e., "currently stopped", "before start-up", "in normal operation", and "currently at fault", as shown in FIG. 4A. Further, the monitoring policy 317 as shown in FIG. 12B is stored in the storing unit 310.

Figure 10:
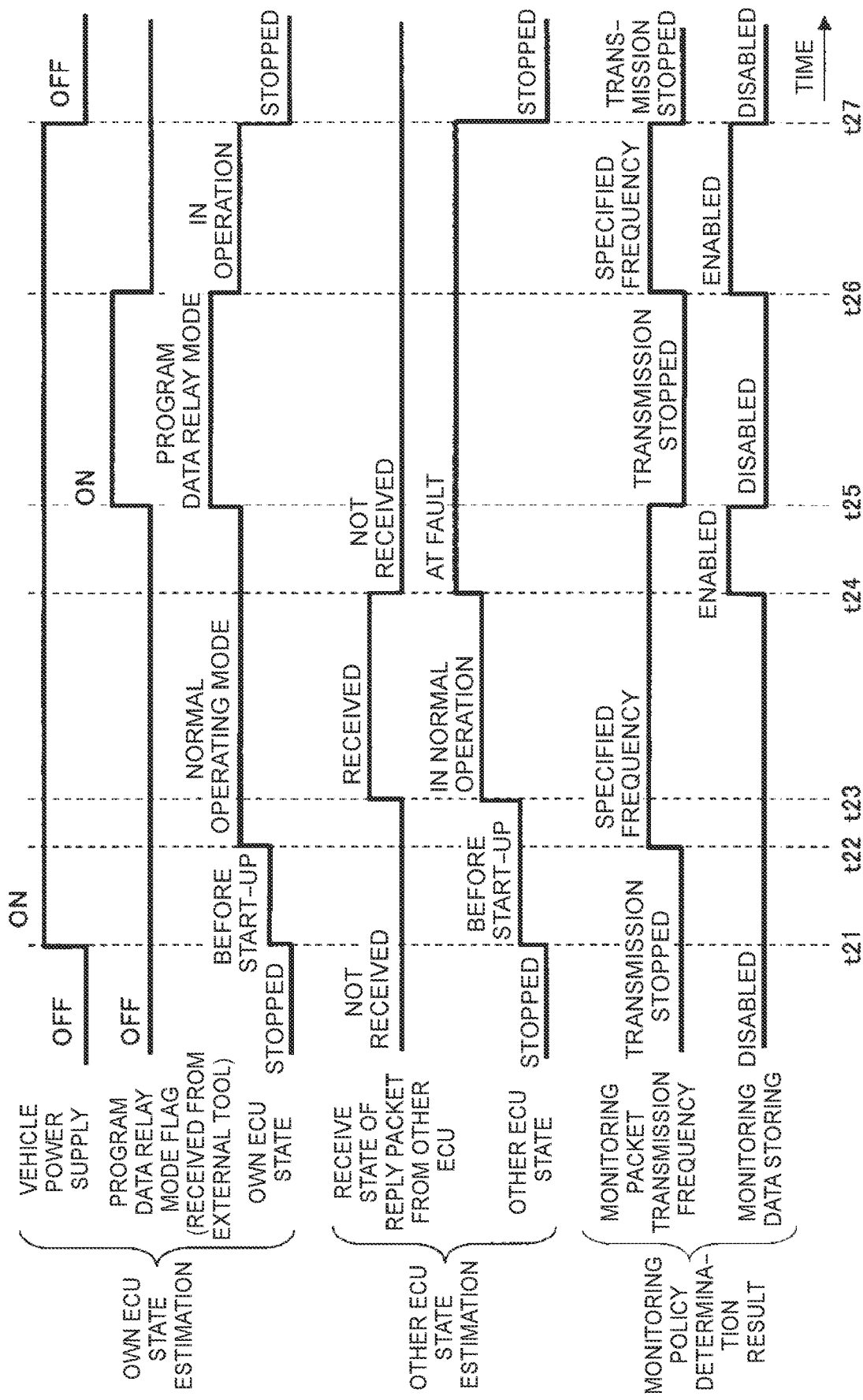
FIG. 10 is a view useful for explaining another example of the monitoring process according to the embodiment.
Figure 11:
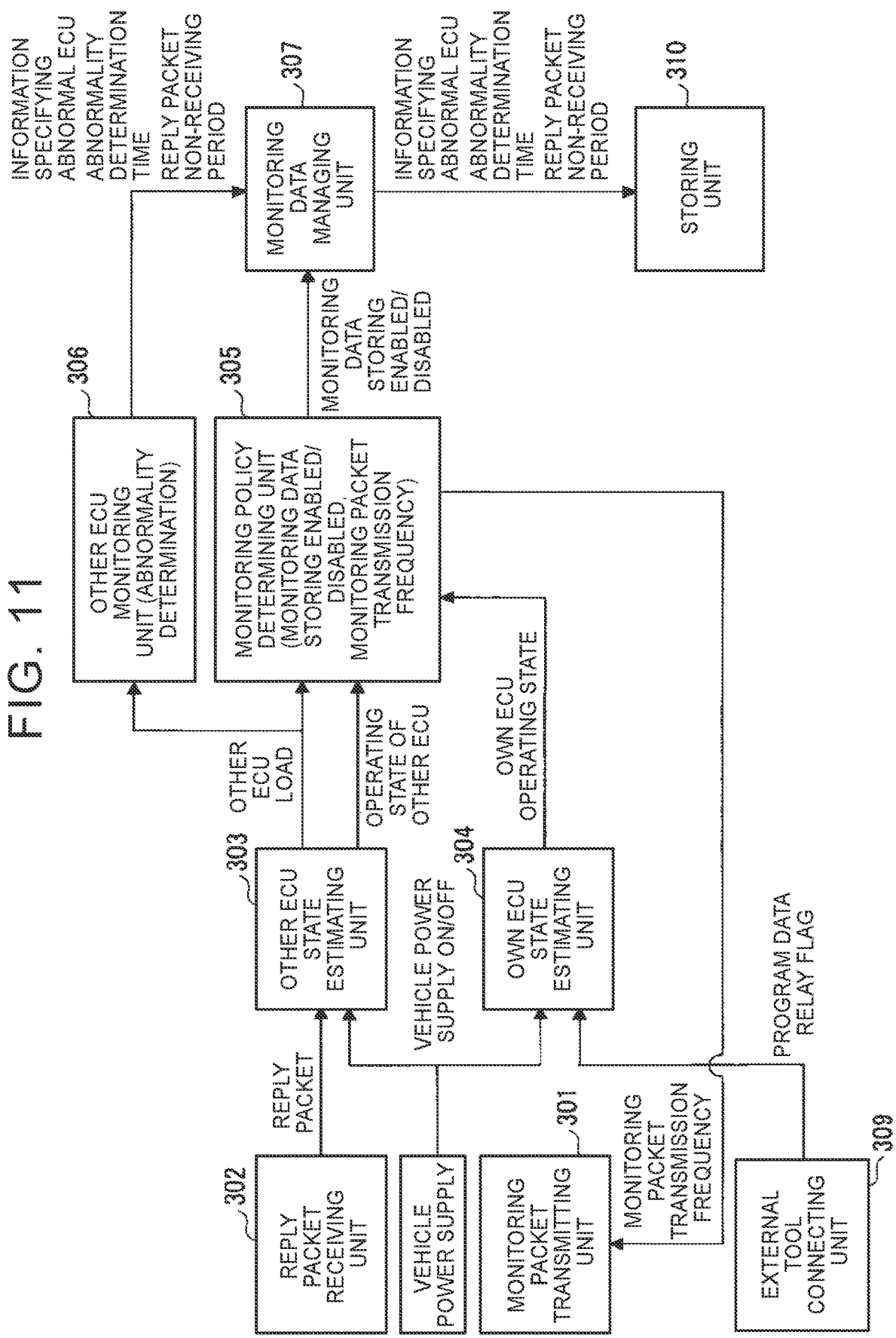
FIG. 11 is a view useful for explaining another example of the monitoring process according to the embodiment.

In this condition, if the vehicle power supply is turned ON at time t21, as shown in FIG. 10, the own ECU state estimating unit 304 of FIG. 11 estimates the operating state of the own ECU as "before start-up", and the other ECU state estimating unit 303 estimates the operating state of the other ECU as "before start-up". At this time, since the state of the own ECU 100 is "before start-up", the monitoring policy determining unit 305 of FIG. 11 selects the monitoring policy that sets the transmission frequency of the monitoring packet to "transmission stopped", and "disables" storing of the monitoring data, from the monitoring policy 317 shown in FIG. 12B.

Then, at time t22 of FIG. 10, the own ECU state estimating unit 304 estimates the operating state of the own ECU 100 as "in the normal operating mode", and the other ECU state estimating unit 303 estimates the operating state of the other ECU as "before start-up". At this time, since the state of the own ECU 100 is "normal operating mode", and the state of the other ECU is "before start-up", the monitoring policy determining unit 305 selects the transmission frequency of the monitoring packet to the "specified frequency", and "disables" storing of the monitoring data, from the monitoring policy 317. As a result, the monitoring packet transmitting unit 301 of FIG. 11 starts transmitting the monitoring packet at the specified transmission frequency.

When the reply packet receiving unit 302 of FIG. 11 receives the reply packet from the other ECU, at time t23 of FIG. 10, the own ECU state estimating unit 304 of FIG. 11 estimates the operating state of the own ECU as "in the normal operating mode", and the other ECU state estimating unit 303 estimates the operating state of the other ECU as "in normal operation". At this time, sine the state of the own ECU 100 is "in the normal operating mode", and the state of the other ECU is "in normal operation", the monitoring policy determining unit 305 selects the monitoring policy that sets the transmission frequency of the monitoring packet to the "specified frequency", and "disables" storing of the monitoring data, from the monitoring policy 317.

Further, when the reply packet receiving unit 302 of FIG. 11 becomes unable to receive the reply packet from the other ECU, at time t24 of FIG. 10, the own ECU state estimating unit 304 of FIG. 11 estimates the operating state of the own ECU as "in the normal operating mode", and the other ECU state estimating unit 303 estimates the operating state of the other ECU as "currently at fault". At this time, since the state of the own ECU 100 is "in the normal operating mode", and the state of the other ECU is "currently at fault", the monitoring policy determining unit 305 selects the monitoring policy that sets the transmission frequency of the monitoring packet to the "specified frequency", and "enables" storing of the monitoring data, from the monitoring policy 317. As a result, the monitoring data managing unit 307 of FIG. 11 stores the information that specifies the abnormal ECU, abnormality determining time, reply packet non-receiving period, etc. in the storing unit 310.

When a program data relay flag accepted by the external tool connecting unit 309 of FIG. 11 is changed to ON, at time t25 of FIG. 10, the own ECU state estimating unit 304 of FIG. 11 estimates the operating state of the own ECU as "in the program data relay mode", and the other ECU state estimating unit 303 estimates the operating state of the other ECU as "currently at fault". At this time, since the state of the own ECU 100 is "in the program data relay mode", the monitoring policy determining unit 305 selects the monitoring policy that sets the transmission frequency of the monitoring packet to "transmission stopped", and "disables" storing of the monitoring data, from the monitoring policy 317.

When the program data relay flag accepted by the external tool connecting unit 309 of FIG. 11 is changed to OFF, at time t26 in FIG. 10, the own ECU state estimating unit 304 of FIG. 11 estimates the operating state of the own ECU as "in the normal operating mode", and the other ECU state estimating unit 303 estimates the operating state of the other ECU as "currently at fault". At this time, since the state of the own ECU 100 is "in the normal operating mode", and the state of the other ECU is "currently at fault", the monitoring policy determining unit 305 selects the monitoring policy that sets the transmission frequency of the monitoring packet to the "specified frequency", and "enables" storing of the monitoring data, from the monitoring policy 317. As a result, the monitoring data managing unit 307 of FIG. 11 stores the information specifying the abnormal ECU, abnormality determining time, reply packet non-receiving period, etc. in the storing unit 310.

When the vehicle power supply is turned OFF at time t27 of FIG. 10, the own ECU state estimating unit 304 of FIG. 11 estimates the operating state of the own ECU as "currently stopped", and the other ECU state estimating unit 303 estimates the operating state of the other ECU as "currently stopped". At this time, since the state of the own ECU 100 is "currently stopped", the monitoring policy determining unit 305 of FIG. 11 selects the monitoring policy that sets the transmission frequency of the monitoring packet to "transmission stopped", and "disables" storing of the monitoring data, from the monitoring policy 317 shown in FIG. 12B.

Thus, when the own ECU 100 operates in the program data relay mode, it stops transmission of the monitoring packet, and stops operation to store monitoring data, even if the operating state of the other ECU is "currently at fault".

Thus, according to this embodiment, the own ECU 100 that monitors other ECUs connected to the on-vehicle network 1 is able to monitor the other ECUs, with settings appropriate to the states of the other ECUs 120 and own ECU 100.

While one embodiment of the disclosure has been described above, this disclosure is not limited to the above embodiment, but may be embodied with various modifications or changes, within the scope of the disclosure as defined in the appended claims.

For example, the operating states of the own ECU 100 shown in FIG. 4C are one example. The operating states of the own ECU 100 may include various operating states, such as a "tool connection mode" indicating a state in which the external tool 130 is connected to the own ECU 100, and "diagnosis mode" indicating a state in which the other ECU is being diagnosed by the external tool 130, for example.

What is claimed is:

1. An electronic control unit configured to monitor a subject electronic control unit that is different from the electronic control unit and configured to be connected to a network, the electronic control unit comprising circuitry configured to:
   transmit a monitoring packet to the subject electronic control unit;
   estimate a state of the subject electronic control unit, based on a reply packet transmitted from the subject electronic control unit in response to the monitoring packet;
   select a monitoring policy according to a combination of the state of the subject electronic control unit estimated by the circuitry and the state of the electronic control unit; and
   monitor the subject electronic control unit, based on the monitoring policy,
   wherein the monitoring policy specifies that a transmission frequency of the monitoring packet is lowered, when a load of the subject electronic control unit is equal to or greater than a first threshold value.

2. The electronic control unit according to claim 1, wherein the circuitry determines a transmission frequency at which the monitoring packet is transmitted, based on the monitoring policy selected according to the combination of the state of the subject electronic control unit estimated by the circuitry, and the state of the electronic control unit.

3. The electronic control unit according to claim 1, wherein the monitoring policy specifies that monitoring data of the subject electronic control unit is not stored, when the state of the subject electronic control unit is a first state in which the subject electronic control unit need not be monitored.

4. The electronic control unit according to claim 3, wherein the first state includes a state before start-up of the subject electronic control unit, or a state in which the subject electronic control unit is stopped.

5. The electronic control unit according to claim 1, wherein the electronic control unit is a relay device that relays communications between the subject electronic control unit and another electronic control unit in the network.

6. The electronic control unit according to claim 5, wherein the monitoring policy specifies that transmission of the monitoring packet to the subject electronic control unit is stopped, when the state of the electronic control unit is a second state in which the subject electronic control unit need not be monitored.

7. The electronic control unit according to claim 6, wherein the second state includes a program data relaying state in which the electronic control unit relays a program for rewriting of the subject electronic control unit, or a program rewriting state in which the electronic control unit rewrites a program of the electronic control unit.

8. The electronic control unit according to claim 1, wherein the circuitry estimates a load of the subject electronic control unit, based on a reply time of the reply packet to the monitoring packet, or a packet loss rate of the reply packet relative to the monitoring packet.

9. The electronic control unit according to claim 1, wherein the monitoring policy specifies that a transmission frequency of the monitoring packet is lowered, when a load of the electronic control unit is equal to or greater than a second threshold value.

10. The electronic control unit according to claim 1, wherein the network is an on-vehicle network installed on a vehicle, and the electronic control unit is a relay device that relays communications between the subject electronic control unit and another electronic control unit which control the vehicle.

11. A monitoring method performed by an electronic control unit configured to monitor a subject electronic control unit and configured to be connected to a network, the monitoring method comprising:
   transmitting a monitoring packet from the electronic control unit to the subject electronic control unit;
   estimating a state of the subject electronic control unit, based on a reply packet transmitted from the subject electronic control unit in response to the monitoring packet;
   select a monitoring policy according to a combination of the state of the subject electronic control unit estimated by circuitry of the electronic control unit and the state of the electronic control unit; and monitoring the subject electronic control unit, based on the monitoring policy, specifying, with the monitoring policy, that a transmission frequency of the monitoring packet is lowered when a load of the subject electronic control unit is equal to or greater than a first threshold value.

12. A non-transitory computer readable medium storing a program that causes an electronic control unit configured to monitor a subject electronic control unit that is different from the electronic control unit and configured to be connected to a network, to execute a process, the process including:

transmitting a monitoring packet to the subject electronic control unit;

estimating a state of the subject electronic control unit, based on a reply packet transmitted from the subject electronic control unit in response to the monitoring packet;

selecting a monitoring policy according to a combination of the state of the subject electronic control unit estimated by circuitry of the electronic control unit and the state of the electronic control unit;

monitoring the subject electronic control unit, based on the monitoring policy, and specifying, with the monitoring policy, that a transmission frequency of the monitoring packet is lowered when a load of the subject electronic control unit is equal to or greater than a first threshold value.

* * * * *